United States Patent
Kameyama

[19]

[11] Patent Number: 5,872,710
[45] Date of Patent: Feb. 16, 1999

[54] INVERTER CONTROL DEVICE

[75] Inventor: Tomohisa Kameyama, Niwa-gun, Japan

[73] Assignee: Okuma Corporation, Nagoya, Japan

[21] Appl. No.: 24,891

[22] Filed: Feb. 17, 1998

[51] Int. Cl.[6] .................................................. H02M 7/217
[52] U.S. Cl. .............................. 363/95; 363/41; 363/131
[58] Field of Search .................................... 363/41, 58, 95, 363/98, 131, 132; 318/802, 805, 811, 254

[56] References Cited

U.S. PATENT DOCUMENTS

| | | | |
|---|---|---|---|
| 4,820,871 | 4/1989 | Tanaka et al. | 219/10.77 |
| 4,876,637 | 10/1989 | Mose et al. | 363/37 |
| 5,177,678 | 1/1993 | Ibori et al. | 363/98 |
| 5,182,463 | 1/1993 | Yamamoto et al. | 307/46 |
| 5,257,180 | 10/1993 | Sashida et al. | 363/71 |
| 5,268,832 | 12/1993 | Kandatsu | 363/95 |
| 5,349,522 | 9/1994 | Konishi et al. | 363/95 |
| 5,381,328 | 1/1995 | Umezawa et al. | 363/41 |
| 5,442,538 | 8/1995 | Ikeda et al. | 363/95 |
| 5,450,306 | 9/1995 | Garces et al. | 363/41 |
| 5,668,713 | 9/1997 | Eguchi et al. | 363/95 |
| 5,764,024 | 6/1998 | Wilson | 318/805 |
| 5,790,396 | 8/1998 | Miyazaki et al. | 363/96 |

*Primary Examiner*—Adolf Berhane
*Attorney, Agent, or Firm*—Oliff & Berridge, PLC

[57] ABSTRACT

A current detecting circuit (19) detects an output voltage of an inverter, a voltage error computing unit (21) computes an voltage error between the output voltage and a voltage command value, a deadtime compensation amount storage unit (18) stores a relationship between the voltage error, and an output current value detected by a current detecting circuit (20). A deadtime compensation computing unit (17) computes a deadtime compensation amount from the deadtime compensation amount storage unit (18) according to a current command value, and an adder (16) adds the deadtime compensation amount and the voltage command value so as to obtain the added correcting voltage command value. The operation of the inverter is controlled on the basis of the computed correcting voltage command value which enables inverter control devices to accurately control output current due by accurate correction of the output voltage.

7 Claims, 9 Drawing Sheets

INVERTER CONTROL DEVICE

BACKGROUND OF THE INVENTION

1. Filed of the Invention

The present invention relates to an inverter control device for use with a driving device such as a motor.

2. Description of the Related Art

FIG. 6 shows an example of an inverter and a conventional system structure of the inverter control device. An inverter 11 for driving a motor 1 comprises transistors 2a, 2b, 2c, 2d, 2e, and 2f including an emitter and a collector, and any of which is connected to a direct-current power supply. Each base of the transistors is connected to output signals from comparators 4a, 4b, 4c, 4d, 4e, or 4f to open or close a flow of current. According to output voltage command values eu*, ev*, and ew* of each phase which is commanded, a duty ratio is controlled, as follows, in comparison with a reference wave signal by comparators 5a, 5b, and 5c. Namely, the output voltage command values eu*, ev*, and ew* which are input to the comparators 5a, 5b, and 5c are compared to a triangular wave signal output from a reference wave generating circuit 9 to make a pulse signal. As the duty ratio of the pulse signal is directly proportional to the output voltage command values eu*, ev*, and ew*, an average value of the voltage applied to the motor 1 is also directly proportional to the output voltage command values eu*, ev*, when the triangular wave signal is high.

In this conventional inverter control device, for example, when the transistors 2a and 2b that make up the inverter 11 are simultaneously turned on, a direct current power supply 3 is short-circuited, and there is a possibility of damage to the circuit due to the flowing of the excessive current. To preventing such a problem, in an example as shown in FIG. 6, an idle time is commonly given to each ON signal of the paired transistors 2a and 2b by circuit elements so as to control to have a predetermined interval in the control of the ON signal of the inverter, with the circuit elements comprising resistors 6a, 6b, and 6c, capacitors 7a, 7b, and 7c, and resistors 8a, 8b, and 8c. This interval is generally called a deadtime, and the deadtime has been produced by a deadtime producing circuit 10 consisting of the comparators 4a, 4b, 4c, 4d, 4e, and 4f, and the above circuit elements.

Existence of the deadtime allows the output voltage of the inverter to generally become nonlinear against the output voltage command values eu*, ev*, and ew* which are input. In an example of a u-phase, the relationship between the output voltage command value and an actual output voltage eu can be approximated by equation (1).

$$eu = eu^* - ed(iu) \quad (1)$$

Where iu represents an output current value of the inverter, and ed(iu) is a function of iu presented with equation (2). The function represented with equation (2) is shown in FIG. 8.

$$\begin{aligned} ed(iu) &= edu \text{ (when } iu > iu\#) \\ &= -du \text{ (when } iu < -iu\#) \\ &= edu/iu\# \text{ (when } -iu\# < iu < iu\#) \end{aligned} \quad (2)$$

Where edu represents a constant determined by the deadtime, and iu# is a fixed constant determined by the time constant of the motor windings.

FIG. 7 illustrates an example of a system structure of a conventional inverter control device for the purpose of correcting nonlinearity between a command value and an output by means of such deadtime. This inverter control device uses the relationship of equation (1) and controls the inverter by applying a correction command value, which is added with the deadtime compensation represented by equation (2), to the voltage command value, and performs deadtime correction. In this device, a deadtime compensation computing unit 17 computes deadtime compensation amounts ed(iu), ed(iv), and ed(iw) on the basis of phase current detecting values iu, iv, and iw, and equation (2). On the other hand, subtracters 13a, 13b, and 13c compute a current error between an current command value and an actual output current value so that a current control computing unit 15a, 15b, and 15c may output the voltage command values eu*, ev*, and ew* according to the current error. Adders 16a, 16b, and 16c add the voltage command values eu*, ev*, and ew* to the respective deadtime compensation amounts euc*, evc*, and ewc*, and output euc*, evc*, and ewc* as correction voltage command values. In an example of u-phase, the relationship between the phase voltage command value and the correction voltage value may be represented with the following equation (3).

$$euc^* = eu^* + ed(iu) \quad (3)$$

Where, as mentioned above, in a device as shown in FIG. 7, the fixed constant is iu# and edu in equation (2) can be used to find the deadtime compensation amount ed(iu) of equation (3). This correction voltage command value is input to a PWM (pulse-width-modulated) circuit 12, and transistors 2a, 2b, 2c, 2d, 2d, 2e, and 2f are turned on or off on the basis of the correction voltage command. It is known that the PWM circuit 12 is used of the same circuit as the inverter control circuit shown, for instance, in FIG. 6. Current detectors 14a, 14b, and 14c shown in FIG. 7 are examples of such detectors for detecting the output current iu to be applied in equations (2) and (3).

Since in a conventional inverter control device as shown in FIG. 7, there exists deadtime, the output voltage of the inverter is nonlinear against the output voltage command which is input and an accurate output voltage can not be obtained. FIG. 9(A) represents the voltage command and the reference wave of the u-phase shown in FIG. 6, in which the triangular wave, transistors 2a and 2b, and the waveform of terminal voltage of the u-phase are shown respectively. Here, Td shown in FIG. 9 indicates deadtime duration, V a plus voltage of the direct-current power supply 3 in FIG. 6, and −V a minus voltage. As shown in FIG. 9, in such a conventional device, when the polarity of the output current of the inverter of FIG. 9(E) is positive, the terminal voltage of the u-phase is V while the transistor 2a in FIG. 9(C) is ON, and, in contrast, when a polarity of the output current in FIG. 9(E) is minus, the terminal voltage of the u-phase is V when the transistor 2b in FIG. 9(D) is OFF. Moreover, when the output current of the inverter in FIG. 9(G) is zero, the terminal voltage of the u-phase is either V when the transistor 2a is ON or −V when the transistor 2b is ON, and the terminal voltage of the u-phase is at a floating level during the deadtime in which both of the transistors 2a and 2b are OFF. Accordingly, an accurate output voltage can not obtained because the output voltage of the inverter is nonlinear versus the input voltage command value, at a changing point of the current polarity, in other words, at neighborhood of the zero point of the output current.

In a conventional inverter control device as shown in FIG. 7, a nonlinear element of the output voltage against the voltage command according to the deadtime is approximated and corrected by applying equation (2). Here, iu# and edu in equation (2) are constant, but, in reality, the value of iu# is changed as the time constant of the motor windings changes due to heating of the motor or the like. The value of edu is not always limited to only one due to a variety of switching devices. The edu error occurs because the value of edu is changed by the heating of the switching devices. Strictly speaking, it may not be approximated by equation (2) when the output current iu is in the range of −iu#<iu<iu#. Since the error of the deadtime compensation amount occurs by these factors, accurate deadtime compensation can not be performed. Accordingly, the conventional device has such a problem that it is hard to accurately control the output current of the inverter.

BRIEF SUMMARY OF THE INVENTION

The present invention was made in view of such problems of the related art, and has an object of providing an inverter control device which can accurately control an output current of the inverter.

A second object of the present invention is to provide an inverter control device which can accurately perform the deadtime compensation, even when the time constant is changed by, for example, the heating of the motor or when an error occurs in edu due to the variety of the switching devices and the heating of the switching devices. This is because a deadtime compensation amount is competed, stored depending on the current detecting value, and the relationship between the deadtime compensation amount and the output current is constantly corrected.

A third object of the present invention is to provide an inverter control device which may carry out accurate deadtime compensation by a simple circuit characterized in that voltage detecting means include a counter which constitutes reference wave generating means, pulse level detecting means for detecting a timing that causes the output pulse signal for each phase of the inverter to switch over from high to low and from low to high, and a plurality of count value holding means for holding a counter value on the basis of the output pulse signal from the pulse level detecting means. The difference between two count values held in the holding means are used as the detecting voltage value of the terminal voltage of the inverter.

These and other objects of the present invention can be accomplished by providing an inverter control device for controlling the inverter including a plurality of switching devices, producing a voltage command value for the inverter on the basis of an error between a given current command value and an output current detecting value, and controlling the inverter on the basis of the voltage command value that comprises voltage detecting value means for detecting an output voltage value of the inverter; output voltage error detecting means for finding a voltage error between the voltage command value and the output voltage value; storage means for storing a relationship between the current detecting value and the voltage error; and deadtime compensation means for finding the voltage error stored in the storage means on the basis of the current detecting value and correcting the voltage command value.

Moreover, the present invention comprises reference wave generating means further comprising a counter constituting the reference wave generating means, wherein the counter counts up and down or is made clear at a predetermined value; pulse level detecting means for detecting threshold levels that cause an output pulse signal for each phase of the inverter to switch over from high to low and from low to high; and a plurality of holding means for holding a value of the counter on the basis of the output pulse signal from the pulse level detecting means. An output pulse width of the inverter is found by a count value held in the holding means.

Furthermore, the inverter control device may be provided with the deadtime compensation amount storage means store a relationship between the deadtime compensation amount and a current detecting value, with the current detecting value comprising a pulse width obtained by the output pulse detecting means, that is, a difference between two values of the counts held in the holding means, and the deadtime compensation amount comprising an error between the voltage command value and the detecting voltage.

BRIEF DESCRIPTION OF THE DRAWINGS

The present invention will next be described with reference to the appended drawings, in which.

DETAILED DESCRIPTION OF THE PREFERRED EMBODIMENTS

Figure 1:
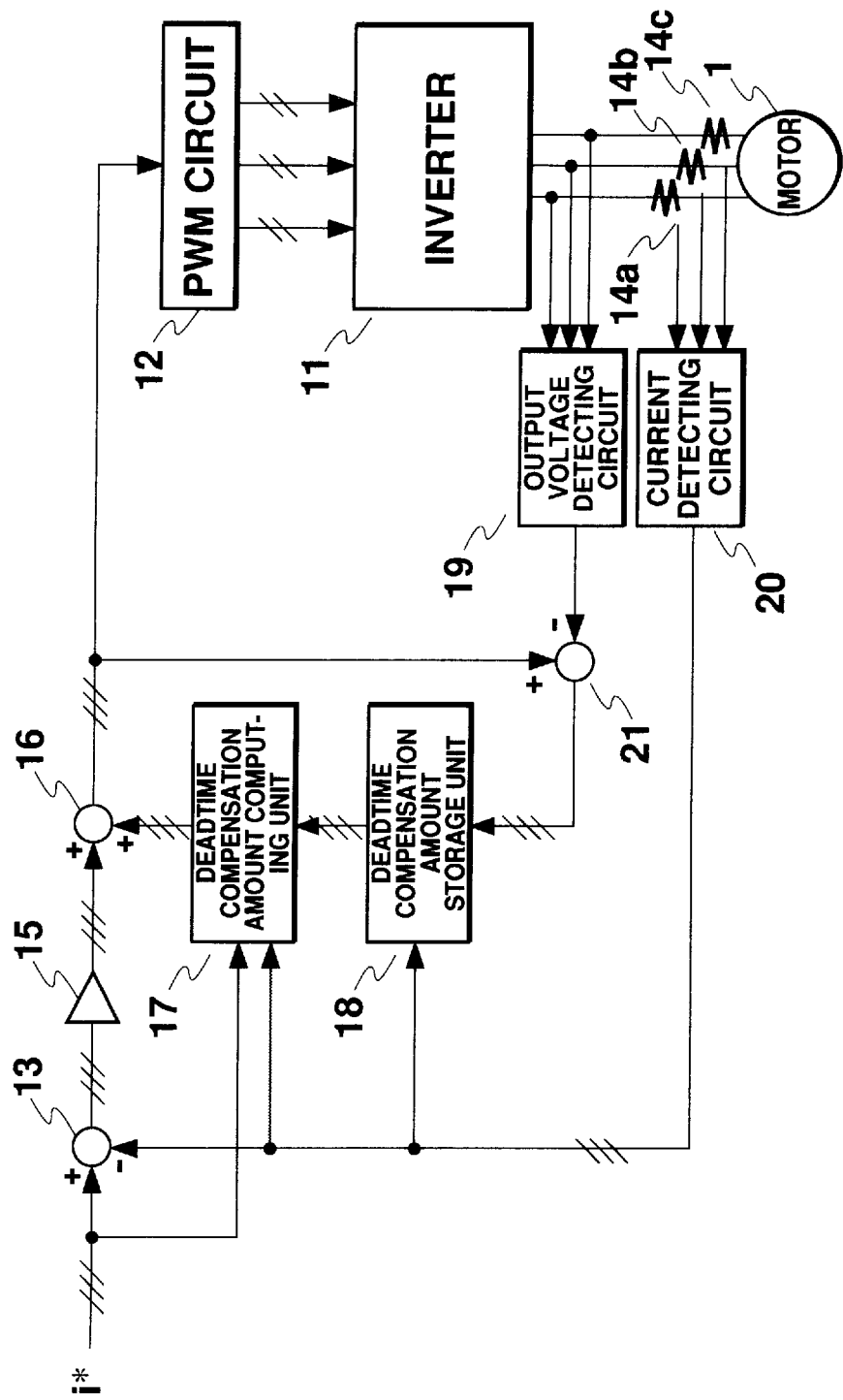
FIG. 1 is a block diagram showing a structure of an embodiment of the inverter control device according to the present invention.
Figure 6:
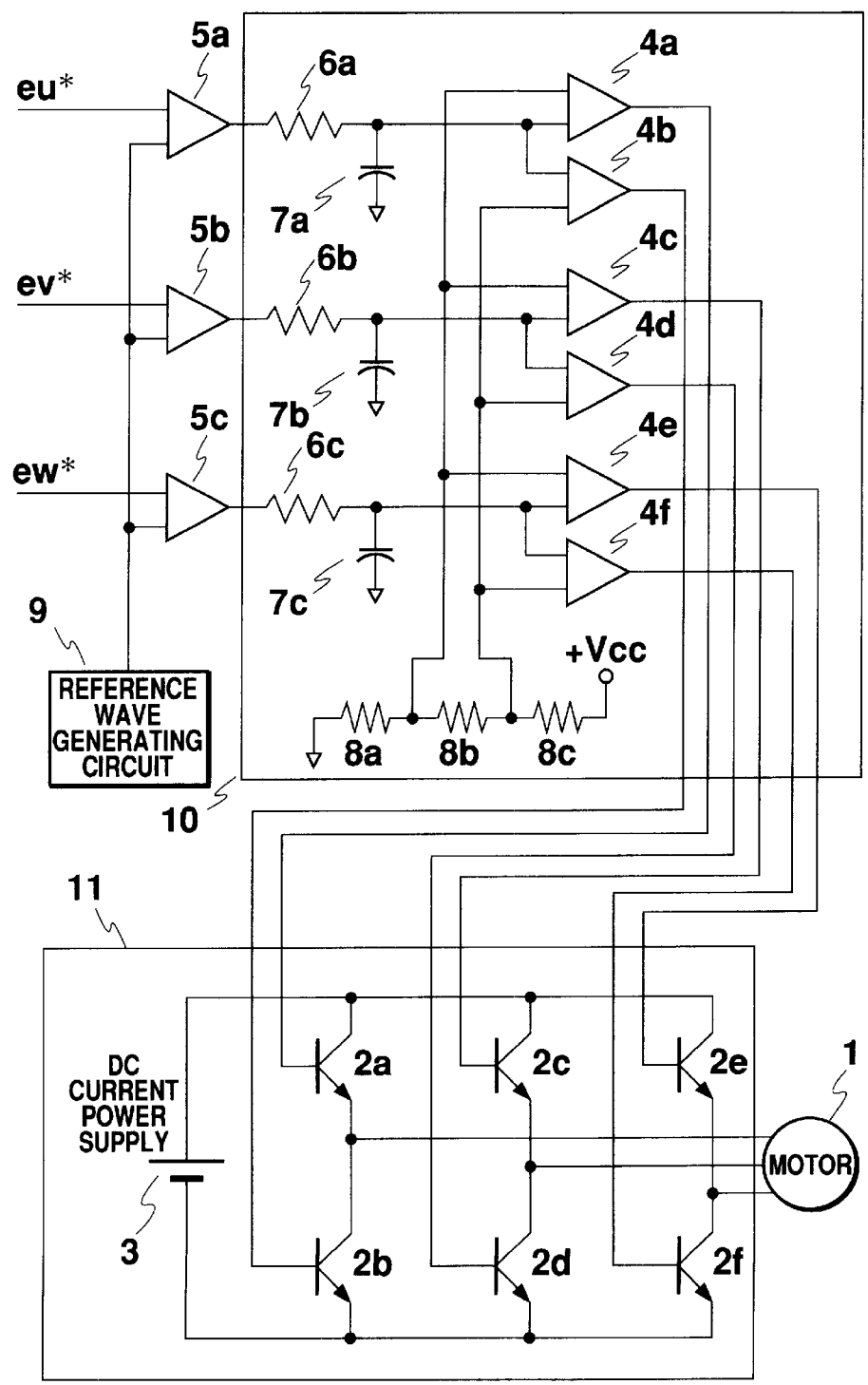
FIG. 6 is a block diagram showing a system structure of the conventional inverter control device.
Figure 7:
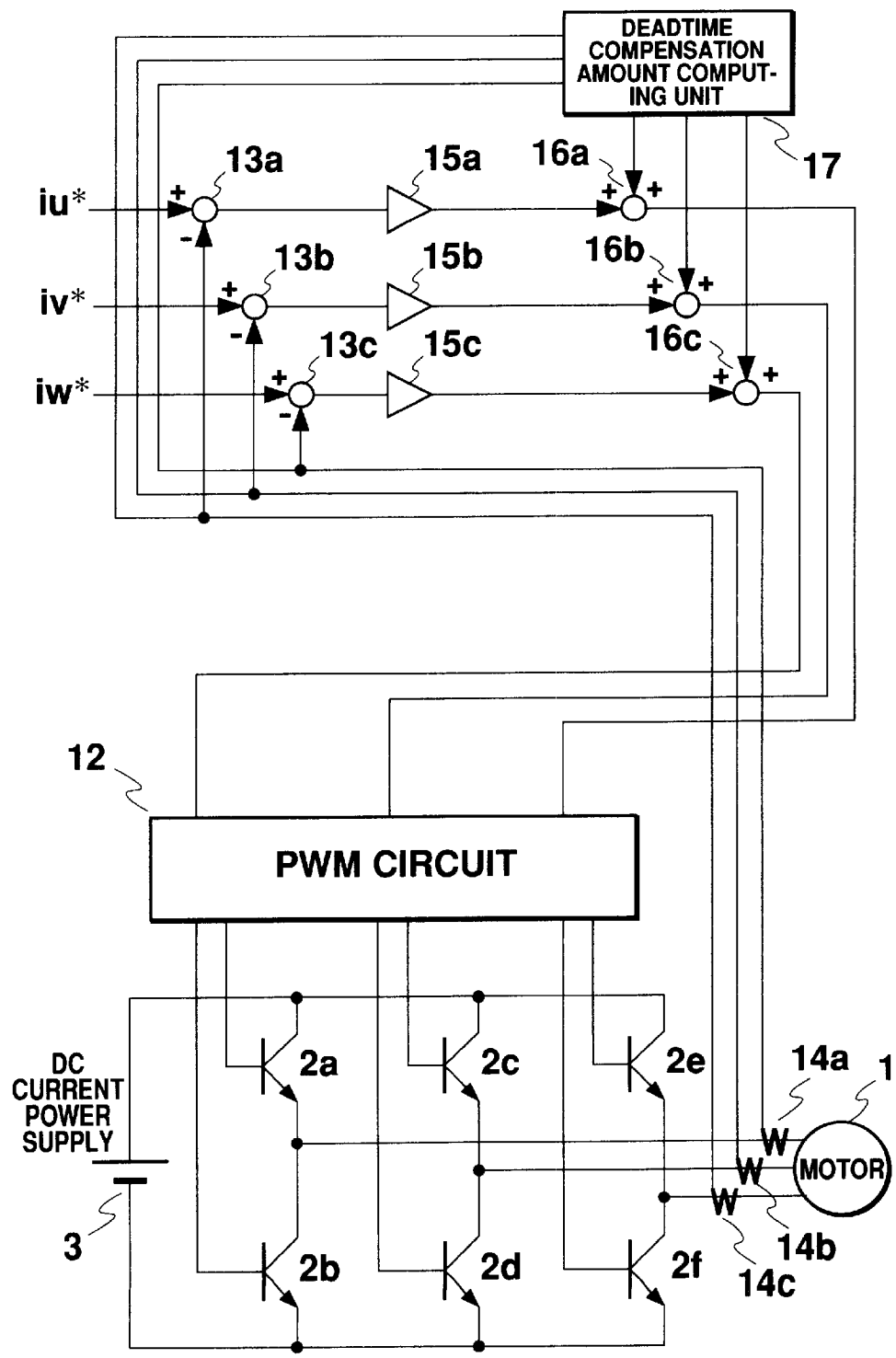
FIG. 7 is a block diagram showing a system structure of a conventional inverter control device.

FIG. 1 shows a system structure of a first embodiment of the present invention. The components corresponding to those of the conventional inverter control device shown in FIGS. 6 and 7 are denoted with the same numerals, and their description will not be repeated.

Figure 8:
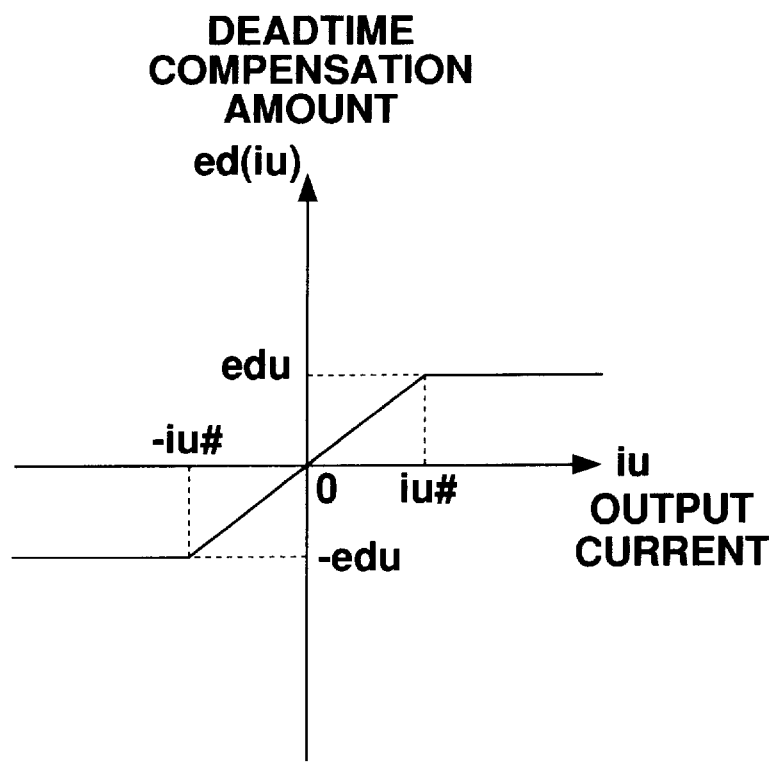
FIG. 8 is a graph showing a relationship between the output current value and the deadtime compensation amount.

In FIG. 1, an inverter control device detects a terminal voltage of an inverter using an output voltage detecting circuit 19, thereby enabling a voltage error computing unit 21 to compute an error between a voltage command value and an output voltage detected by the output voltage detecting circuit 19. A deadtime compensation amount storage unit 18 stores, as computing data for the deadtime compensation amount, output current detecting values detected by current detectors 14a, 14b, 14c and by a current detecting circuit 20, and the voltage error amount computed by the voltage error computing unit 21 so as to correct a relationship between the current detecting value and the voltage error. The correction may, for example, be carried out using the current detecting value of the horizontal axis and the voltage error the vertical axis as shown respectively in FIG. 8, in other words, by using the current value and the voltage error amount in which a value of an initial relationship of the deadtime compensation amount is detected. According to the current detecting value or the current command value, a deadtime compensation amount computing unit 17 computes the deadtime compensation amount on the basis of the data stored in the deadtime compensation amount storage unit 18. An adder 16 adds the computed deadtime compensation amount and the voltage command value, and the added correcting voltage command value is then input to a PWM circuit 12. Dotted lines in FIG. 8 show such a case where the deadtime compensation amount computing unit 17 computes the deadtime compensation amount stored in the deadtime compensation amount storage unit according to the current detecting value.

Figure 2:
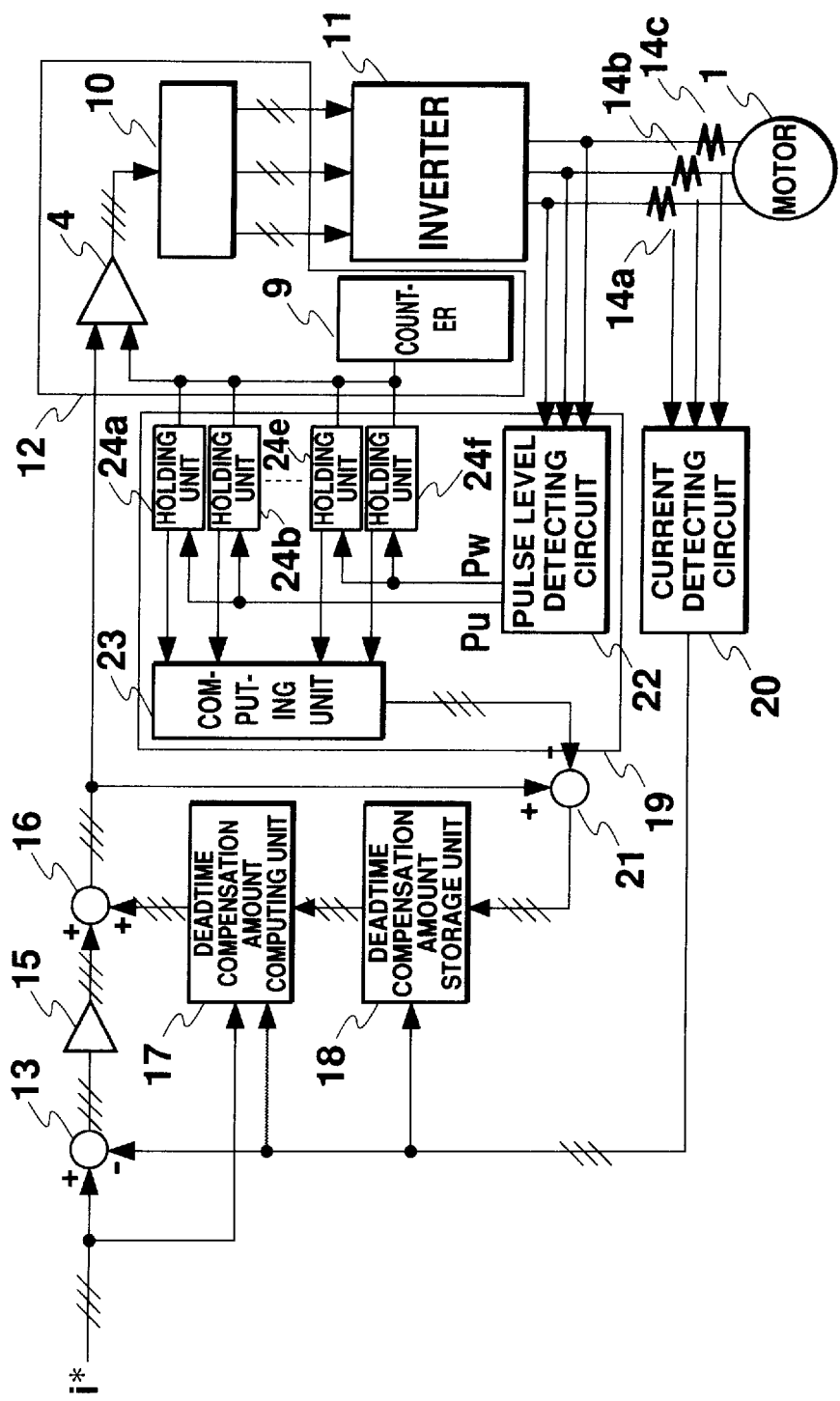
FIG. 2 is a block diagram showing a structure of an embodiment of the inverter control device.

Another embodiment of the inverter control device of the invention will now be described with reference to FIG. 2. The components corresponding to those already describe for FIGS. 1, 6, 7, or 8 are denoted with the same numerals, and their description will not be repeated.

Figure 3:
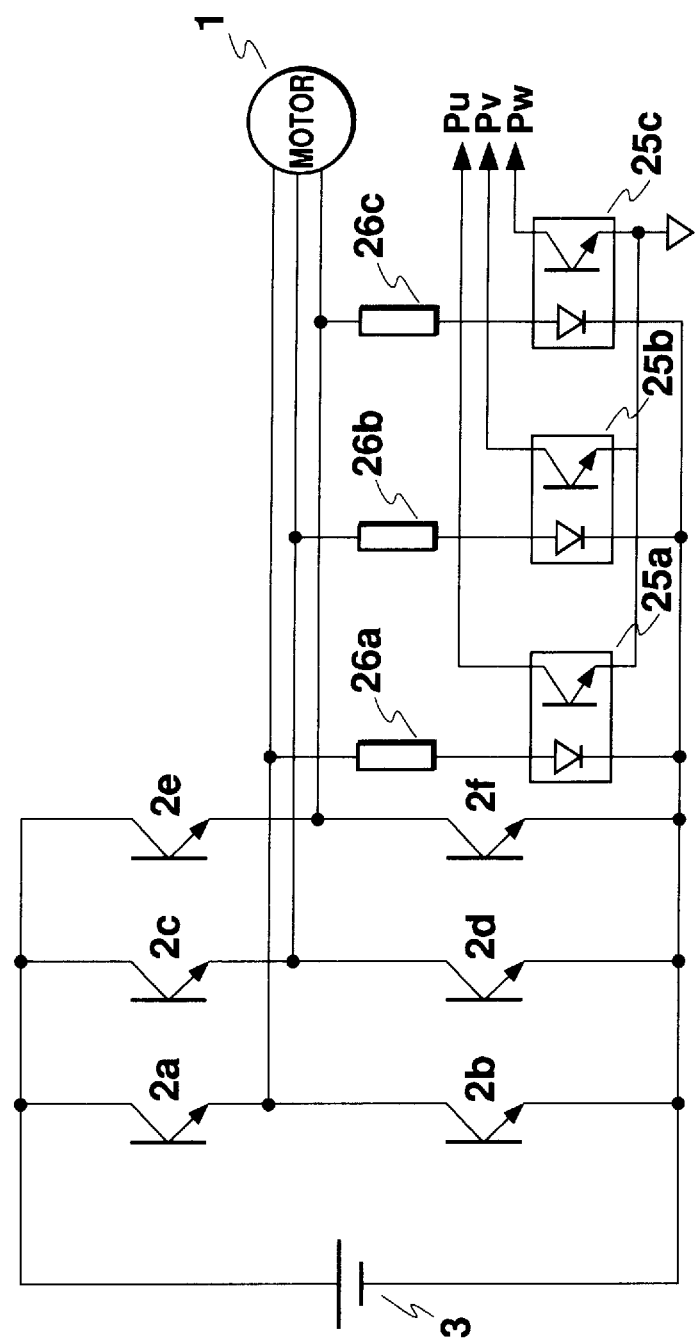
FIG. 3 shows an example of a pulse detecting circuit according to the present invention.
Figure 9:
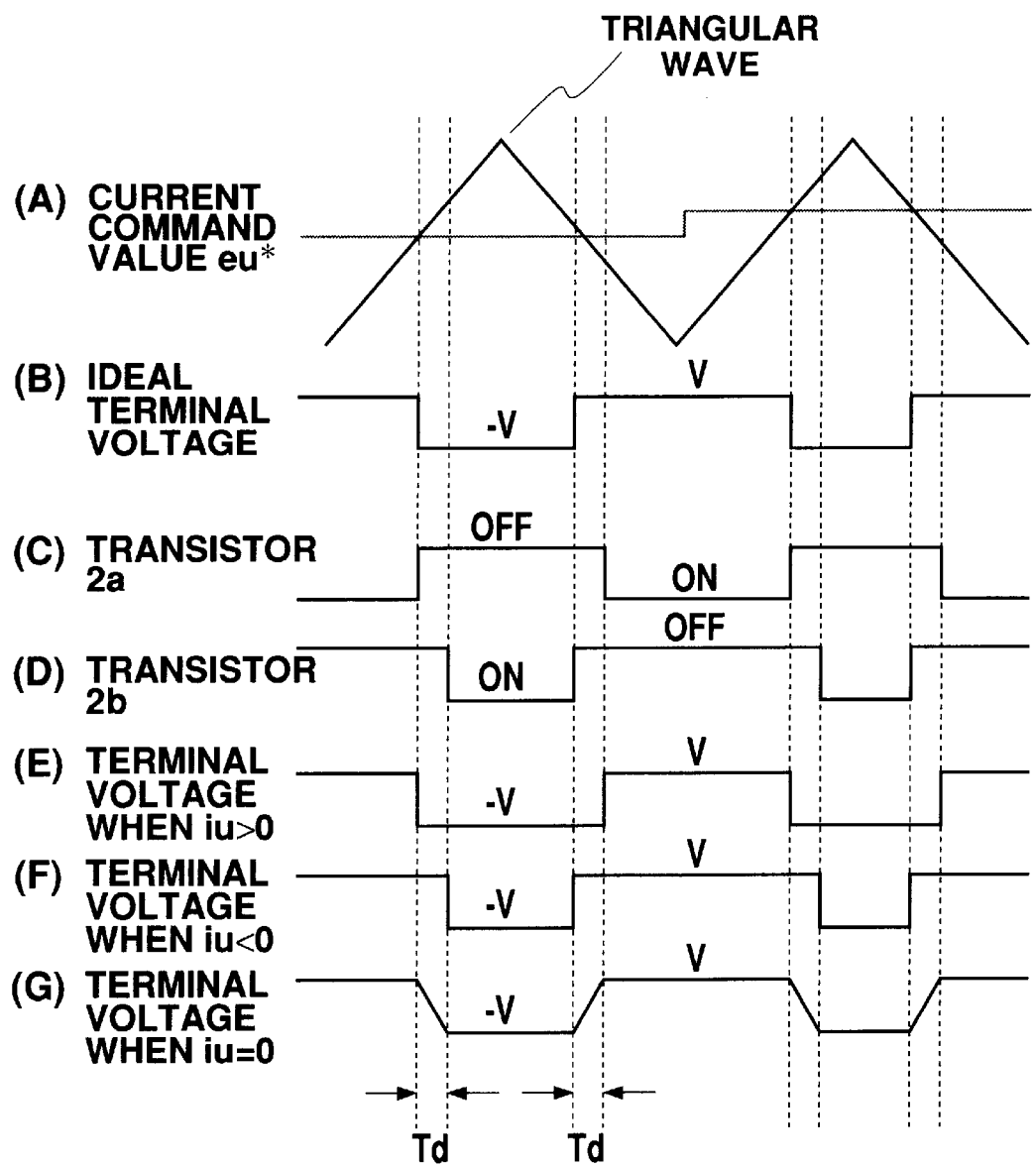
FIG. 9a–g is a time chart showing a relationship between polarity of the output current and the output voltage in the inverter according to a general inverter control device.

In a computing method of the voltage error amount, that is, of the deadtime compensation amount in this embodiment a pulse level detecting circuit 22 first detects an output pulse level of the inverter and outputs pulse level detecting signals Pu, Pv and Pw. The pulse level detecting circuit 22 comprises resistors 26a, 26b, and 26c, and photocouplers 25a, 25b, and 25c, as shown in FIG. 3. The pulse level detecting circuit 22 outputs a low signal when the terminal voltage is high as shown by V in FIG. 9 and outputs pulse level detecting signals Pu, Pv, and Pw as high signals when the terminal voltage is low as shown by −V in FIG. 9. In this embodiment, a reference wave generating circuit 9 outputs a triangular wave to compare the voltage command on the basis of an output signal of a counter by using a counter circuit. Holding units 24a, 24b, 24c, 24d, 24e, and 24f latch a count value of the counter applied in the reference wave generating circuit 9 at leading or trailing edges of the pulse level detecting signals Pu, Pv and Pw. In FIG. 2, the pulse level detecting signal Pv of a V-phase and the holding units 24c and 24d are omitted. For instance, in the case of a u-phase, the holding unit 24a latches the count value at the leading edge of the pulse detecting signal Pu which is an output signal from the pulse level detecting circuit 22, and the holding unit 24a latches the count value at the trailing edge of the pulse detecting signal Pu. The latched count value computes the number of counts of a pulse width by a computing unit 23.

Next, the voltage error computing unit 21 computes an error between the voltage command (the output from the adder 16), that is, a duty command of the output pulse signal from the inverter and the count value of the output pulse signal detected by the output voltage detecting circuit 19.

Figure 4:
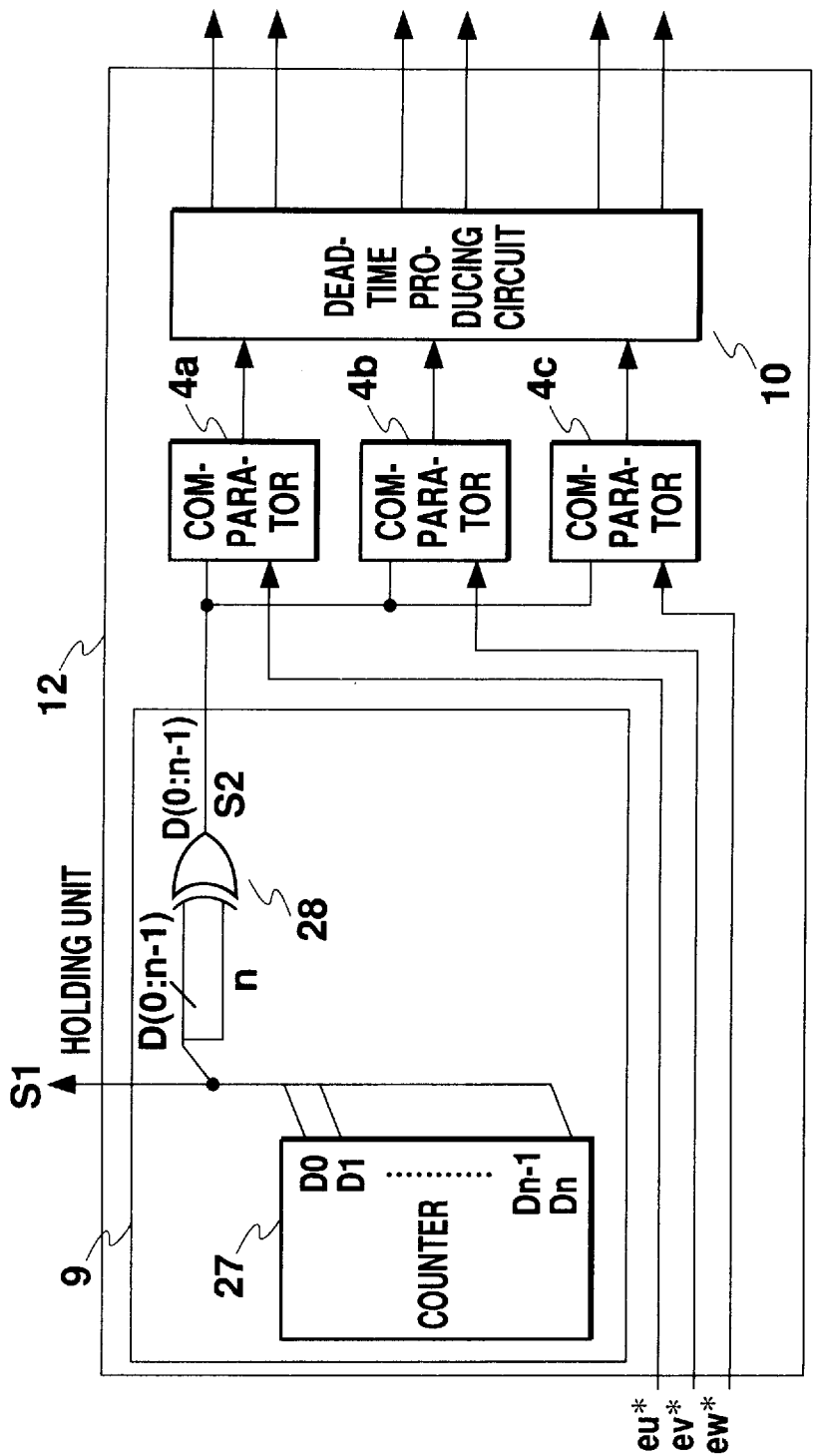
FIG. 4 is an example of a PWM circuit according to the present invention.

The reference wave generating circuit 9 will be described with reference to FIG. 4 in which the PWM circuit of the invention is shown. The reference wave generating circuit 9 comprises a counter 27 and a logic circuit 28, and outputs in the form of a triangular wave changed from sawtooth waveform by exclusively OPing n-bit data Dn of the count value of the counter and data D in the range from 0 bit to n-1 bit (0:n−1).

Figure 5:
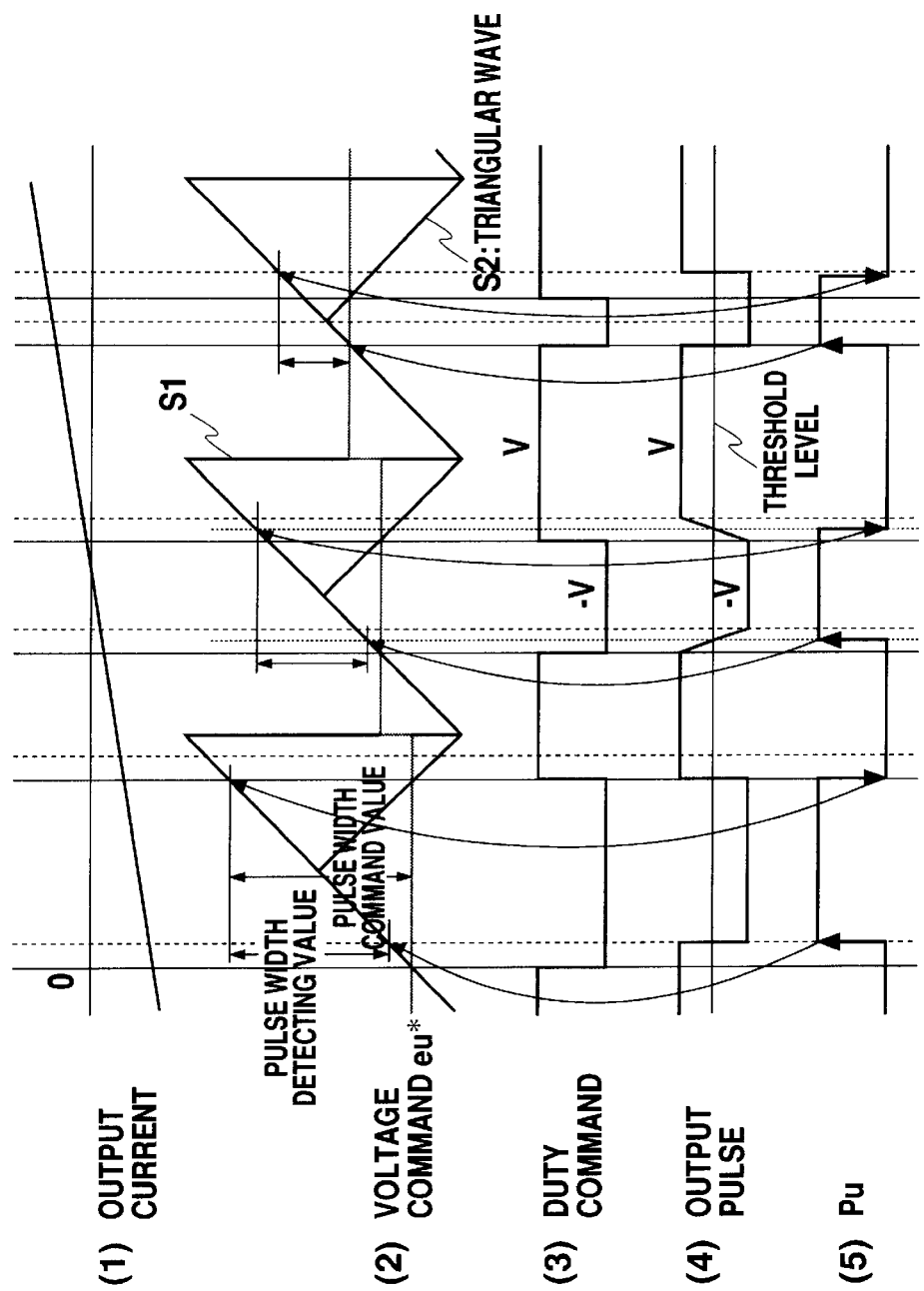
FIG. 5 is a time chart describing an operation of an embodiment of the present invention.

Next, an operation will be described using the u-phase as an example with reference to the time chart given in FIG. 5. The output signal of the counter used in the reference wave generating circuit 9 is denoted with S1 in (2) in FIG. 5, and the triangular wave which is the output signal from the reference wave generating wave 9 is denoted with S2 in (2). The voltage command value is compared to a triangular wave signal such as illustrated in (2) so as to output the PWM circuit as the duty command. The terminal voltage represents in the waveform shown with "(4) output pulse" in FIG. 5. The pulse level detecting circuit 22 detects the output pulse signal so that the circuit 22 outputs the pulse level detecting signal Pu of (5). The holding unit 24a latches the count value at the leading edge of the pulse level detecting signal Pu of (5), while the holding unit 24b latches the count value at the trailing edge of the pulse level detecting signal Pu. The difference of the latched count value is the pulse width detecting value of the output pulse signal. Moreover, the pulse width command value is a half of the maximum value of the count value or, in other words, two times the value made to subtract the voltage value from the maximum value of the triangular wave. The deadtime compensation amount is one half of the difference between the pulse width detecting value and the pulse width command value.

As described above, according to the inverter control device of the present invention, the deadtime compensation amount is found by the detected output voltage value, and deadtime compensation amount storage means store and correct the relationship between the deadtime compensation amount and the output current value. Moreover, the deadtime compensation amount computing unit computes the corrected deadtime compensation according to the current detecting value and the current command value, and the voltage command correction means correct the voltage command value by using the deadtime compensation amount so as to output the corrected voltage command value obtained by this correction. As a result, the output current of the inverter can be accurately controlled for cases in which there are change in the time constant of the motor windings, the qualitative variety of the switching devices, the heating of the switching devices, and so on.

The present invention, because it enables accurate control of the current flow in a motor, can perform precise control of output torque and speed.

While there have been described what are at present considered to be preferred embodiments of the invention, it will be understood that various modifications may be made thereto, and it is intended that the appended claims cover all such modifications as fail within the true sprit and scope of the invention.

I claim:

1. An inverter control device for controlling an inverter by producing a voltage command value on the basis of an error between a given current command value and an output current of said inverter and performing pulse-width-modulation on the basis of said voltage command value, said inverter control device comprising:

voltage detecting value means for detecting an output voltage value of said inverter;

output voltage error detecting means for finding a voltage error between said voltage command value and said output voltage value;

storage means for storing a relationship between said current detecting value and said voltage error; and deadtime compensation means for finding said voltage error stored in said storage means on the basis of said current detecting value and correcting said voltage command value.

2. An inverter control device according to claim 1, wherein said deadtime compensation means find said voltage error stored in said storage means on the basis of said current command value in place of said current detecting value, and correct said voltage command value.

3. An inverter control device according to claim 1, further comprising:

a counter constituting said reference wave generating means, wherein said counter counts up and down or is made clear at a predetermined value;

pulse level detecting means for detecting threshold levels that cause an output pulse signal for each phase of said inverter to switch over from high to low and from low to high;

a plurality of holding means for holding a value of said counter on the basis of said output pulse signal from said pulse level detecting means; and wherein an output pulse width of said inverter is found by a count value held in said holding means.

4. An inverter control device for controlling an inverter by producing a voltage command value on the basis of an error between a given current command value and an output current of said inverter and performing pulse-width-modulation on the basis of said voltage command value, said inverter control device comprising:

voltage detecting value means for detecting an output voltage value of said inverter;

output voltage error detecting means for finding a voltage error between said voltage command value and said output voltage value;

storage means for storing into a data table, in said data table said current detecting value assigned as an address and said voltage error assigned as data; and deadtime compensation means for finding said voltage error stored in said storage means on the basis of said current detecting value and correcting said voltage command value.

5. An inverter control device according to claim 4, wherein said deadtime compensation means find said voltage error stored in said storage means on the basis of said current command value in place of said current detecting value, and correct said voltage command value.

6. An inverter control device according to claim 4, further comprising:

a counter constituting said reference wave generating means, wherein said counter counts up and down or is made clear at a predetermined value;

pulse level detecting means for detecting threshold levels that cause an output pulse signal for each phase of said inverter to switch over from high to low and from low to high;

a plurality of holding means for holding a value of said counter on the basis of said output pulse signal from said pulse level detecting means; and wherein an output pulse width of said inverter is found by a count value held in said holding means.

7. An inverter control device according to claim 3, further Comprising deadtime compensation amount storage means for storing a relationship between said deadtime compensation amount and said current detecting value, wherein:

said voltage detecting value comprises a difference between said two values of said counts held in said holding means, said deadtime compensation amount comprises an error between said voltage command value and said detecting voltage, and said plurality of holding means hold said value of said counter on the basis of two kinds of said output signals from said pulse level detecting means.

* * * * *